W. W. MOORE.
Horse Hay-Forks.

No. 146,542.             Patented Jan. 20, 1874.

Witnesses.
A. F. Cornett.
Oscar W. Crowell

Inventor.
W. W. Moore.
Per Burridge & Co.
Attys.

UNITED STATES PATENT OFFICE.

WALTER W. MOORE, OF MANTUA, OHIO.

IMPROVEMENT IN HORSE HAY-FORKS.

Specification forming part of Letters Patent No. 146,542, dated January 20, 1874; application filed September 8, 1873.

*To all whom it may concern:*

Be it known that I, WALTER W. MOORE, of Mantua, in the county of Portage and State of Ohio, have invented a certain new and Improved Hay-Fork, of which the following is a clear and complete description, reference being had to the accompaning drawings making part of the same.

Figure 1:
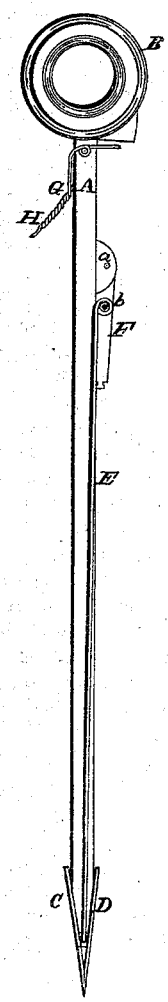
Figure 2:
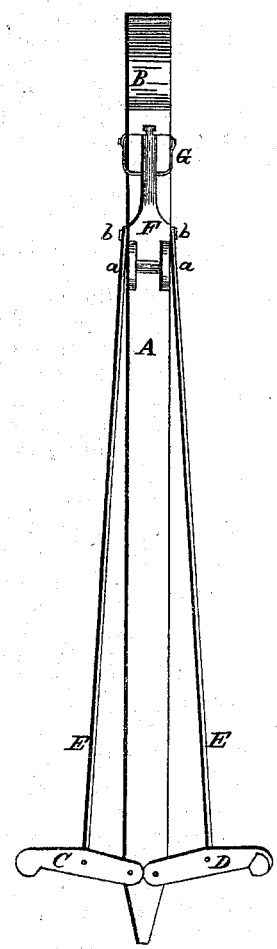
Figure 3:
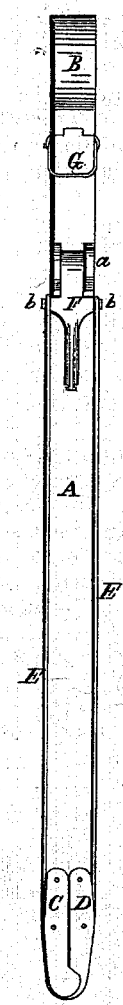

Figures 1 and 3 are views of the fork when shut. Fig. 2 is a view of the fork when open.

Like letters of reference refer to like parts in the several views.

The nature of this invention relates to a hay-fork; and it has for its object the unloading of hay by the use of a horse attached thereto by the intervention of ropes and pulleys.

The construction and operation of said-fork are as follows: A is a shank, the upper end of which terminates in an eye, B. To the lower end is pivoted a pair of arms, C D. The outer ends of the arms are rounded and brought to a sharp edge, as shown in Fig. 2, which, on being closed together, as shown in Fig. 3, shut by each other as a pair of shears, forming a blunt but sharp cutting end to the shank A. To each of the arms is pivoted one end of a link, E, the upper end of which is pivoted to a lever or arm, F. Said arm is pivoted to the shank at $a$.

The operation of the above-described fork is as follows: It is suspended over the load of hay by the eye B to a pulley, the fork is drawn down to the load, and in the position shown in Figs. 1 and 3—the arms C D being closed, the arm F resting against the side of the shank A, and the pivot $b$ being back of pivot $a$, thus locking the arms C D against any tendency to open by being pressed downward—is thrust down into the hay. When therein the arms C D are expanded, as shown in Fig. 2, by pulling upward on the lever or arm F until the pivoted point $b$ passes back of the pivoted point $a$, thereby bringing the line of draft of gravity on the opposite side of said point $a$, in which position it is retained by the upper end of the arm F resting against the side of the shank, as shown in Fig. 2, under which is the bow of the trip G. The fork thus loaded is lifted by the pulleys, and, by certain arrangements, conveyed over the bay, into which the hay is dropped from the fork by pulling upon the end H of the trip G, which will force the arm F back from the shank so far as to bring the line of gravity outside the point $a$. The weight of the hay will close the arms C D together and allow the hay to drop off. The position of the pivots $a$ and $b$, above described, locks the arms together, and the fork is now returned to the load of hay, and the operation again repeated, as before. In consequence of the sharp cutting ends of the arms C D, the fork is easily forced into the hay, as it will readily cut its way down. On expanding the arms, the links, by their outward movement, press the hay together, rendering it compact, so that it will lodge upon the arms with more security than if the hay were free and loose.

I claim—

The combination and arrangement of the shank A, arms C D, arm F, and trip G, the links being pivoted to said arm F, so that the pivotal point $b$ shall pass back of the pivotal point $a$, when the arms C D are opened and closed, as and for the purpose described.

WALTER W. MOORE.

Witnesses:
W. H. BURRIDGE,
A. F. CORNELL.